(12) United States Patent
Kato et al.

(10) Patent No.: US 9,902,448 B2
(45) Date of Patent: Feb. 27, 2018

(54) UTILITY VEHICLE

(71) Applicant: HONDA MOTOR CO., LTD., Tokyo (JP)

(72) Inventors: Takaaki Kato, Wako (JP); Tomoki Ito, Wako (JP); Susumu Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/826,539

(22) Filed: Aug. 14, 2015

(65) Prior Publication Data

US 2016/0052575 A1 Feb. 25, 2016

(30) Foreign Application Priority Data

Aug. 21, 2014 (JP) .................................. 2014-168396

(51) Int. Cl.
*B60B 15/26* (2006.01)
*B62D 61/12* (2006.01)

(52) U.S. Cl.
CPC .............. *B62D 61/12* (2013.01); *B60B 15/26* (2013.01); *B60B 15/263* (2013.01); *B60B 2900/721* (2013.01); *B60Y 2200/20* (2013.01)

(58) Field of Classification Search
CPC ......... B60B 15/00; B60B 15/26; B60B 39/00; B60B 11/02; B60B 11/10; B60C 27/045
See application file for complete search history.

(56) References Cited

U.S. PATENT DOCUMENTS

| 1,384,170 | A | | 7/1921 | Vincent | |
|---|---|---|---|---|---|
| 1,521,824 | A | * | 1/1925 | Merrill | ...................... H02P 7/06 318/73 |
| 1,599,001 | A | * | 9/1926 | Anderson | ............... B60C 27/06 152/208 |
| 2,311,475 | A | * | 2/1943 | Schmeiser | ............ B60B 15/263 301/38.1 |
| 2,336,959 | A | * | 12/1943 | Redman | ................ B60B 15/263 301/38.1 |
| 2,424,799 | A | | 7/1947 | Colombo | |
| 3,014,547 | A | | 12/1961 | Van Der Lely | |
| 3,206,253 | A | * | 9/1965 | Bedan | ................... B60B 15/263 301/44.1 |
| 3,495,672 | A | * | 2/1970 | Barr | ...................... B60F 3/0007 180/15 |

(Continued)

FOREIGN PATENT DOCUMENTS

| EP | 2574263 | A2 | * | 4/2013 | ............. A47L 9/009 |
|---|---|---|---|---|---|
| FR | 500.551 | | | 3/1920 | |

(Continued)

OTHER PUBLICATIONS

European Search Report dated Jan. 18, 2016, 6 pages.
Japanese Office Action dated Jul. 27, 2017, English text, 3 pages.

*Primary Examiner* — Joseph M Rocca
*Assistant Examiner* — Daniel S Yeagley
(74) *Attorney, Agent, or Firm* — Rankin, Hill & Clark LLP

(57) ABSTRACT

In a utility vehicle having a body and driven wheels rotatably fastened to the body, auxiliary driven wheels, having an outer diameter smaller than that of the driven wheels and a width equal to or smaller than that of the driven wheels, are coaxially fixed to the driven wheels.

7 Claims, 3 Drawing Sheets

(56) References Cited

U.S. PATENT DOCUMENTS

| | | | | |
|---|---|---|---|---|
| 3,612,613 A * | 10/1971 | Tricon | | B60B 15/263 242/392 |
| 3,853,419 A * | 12/1974 | Bertram | | E02D 3/026 172/540 |
| 4,059,229 A * | 11/1977 | Pescetto | | A01G 25/09 239/728 |
| 4,666,216 A * | 5/1987 | Smith | | B60B 11/10 301/39.1 |
| 5,556,487 A * | 9/1996 | Collard | | B60B 15/02 152/179 |
| 5,716,106 A * | 2/1998 | Warner | | B60B 15/263 301/40.1 |
| 7,198,084 B2 * | 4/2007 | Riemer | | B60C 27/16 152/187 |
| 9,221,310 B1 * | 12/2015 | Cameron | | B60C 27/20 |
| 2005/0229340 A1 * | 10/2005 | Sawalski | | A47L 11/24 15/50.3 |
| 2008/0065265 A1 * | 3/2008 | Ozick | | G05D 1/0231 700/245 |
| 2008/0252135 A1 * | 10/2008 | Mills | | B60B 15/025 301/40.1 |
| 2011/0056759 A1 * | 3/2011 | Chiu | | A47L 9/009 180/218 |
| 2012/0023887 A1 * | 2/2012 | Messina | | A01D 34/008 56/320.1 |
| 2012/0189507 A1 * | 7/2012 | Ko | | A47L 5/225 422/291 |
| 2014/0031977 A1 * | 1/2014 | Goldenberg | | B25J 9/08 700/245 |
| 2014/0084670 A1 * | 3/2014 | Sanchez, Sr. | | B60B 11/10 301/11.1 |

FOREIGN PATENT DOCUMENTS

| | | |
|---|---|---|
| FR | 1.337.436 | 9/1963 |
| JP | 40-3044 | 0/1965 |
| JP | 48-075338 | 12/1971 |
| JP | 61-018501 | 1/1986 |
| JP | H10-315701 | 12/1998 |
| JP | 3052701 | 6/2000 |
| JP | 2013-047663 | 3/2013 |

* cited by examiner

UTILITY VEHICLE

CROSS-REFERENCE TO RELATED APPLICATION

This application is based upon and claims the benefit of priority from Japanese Patent Application No. 2014-168396 filed on Aug. 21, 2014, the contents of which are incorporated herein by reference.

BACKGROUND OF THE INVENTION

Field of the Invention

This invention relates to a utility vehicle, particularly to an autonomously navigating utility vehicle, more particularly to driven wheels of the utility vehicle configured to enhance bad-terrain driving tenacity.

Description of Related Art

A conventional driven wheel for improving running performance on bad terrain is taught by, for example, Patent Document 1 (Japanese Laid-Open Patent Application H10-315701).

The technical concept of Patent Document 1, which relates to wheelchair tires, is to provide air tire members (driven wheels) that roll on a ground surface and solid tire members (auxiliary tires) of smaller diameter than the air tire members installed concentrically with the air tire members, so that if an air tire should stick in a gutter or uneven region, it can be freed by means of the associated auxiliary tire.

SUMMARY OF THE INVENTION

In the configuration according to the teaching of Patent Document 1, the width of the auxiliary tire members is made wider than the width of the air tire members in order to prevent even an auxiliary tire from getting stuck in a road impediment, while simultaneously avoiding degradation of the energy efficiency and quietness achieved by the air tire members during ordinary travel.

Although the large width of the auxiliary tires as described in Patent Document 1 minimizes likelihood of sticking in a road impediment, the wide width cannot be called categorically desirable because if an auxiliary tire should itself lodge in a road impediment, the difficulty of extraction increases in proportion to width.

Moreover, the wide width of the auxiliary tire enlarges the overall tire width, which in a utility vehicle is sometimes liable to degrade work performance by, for example, causing work to go unfinished work at the fringe (edge) of a working area.

On the other hand, if the only purpose were to improve bad-terrain driving tenacity, a conceivable approach would be to simply increase the width and outer diameter of the driven wheels per se, without providing any auxiliary tires, but this might spoil the appearance of the serviced working area because wider wheels leave more salient tracks. In addition, enlarging the outer diameter of the driven wheels would increase the size of the utility vehicle proper, which would in turn have the undesirable effect of impairing working performance on a narrow road or similar.

Therefore, the object of this invention is to solve the foregoing problems by providing a utility vehicle that enhances bad-terrain driving tenacity without detracting from utility vehicle working performance.

In order to achieve the object, this invention provides a utility vehicle having a body and a driven wheel rotatably fastened to the body, comprising: an auxiliary driven wheel coaxially fixed to the driven wheel and having an outer diameter smaller than that of the driven wheel and a width equal to or smaller than that of the driven wheel.

BRIEF DESCRIPTION OF THE DRAWINGS

The above and other objects and advantages will be more apparent from the following description and drawings in which.

DETAILED DESCRIPTION OF THE INVENTION

A utility vehicle according to an embodiment of this invention is explained with reference to the attached drawings in the following.

Figure 1:
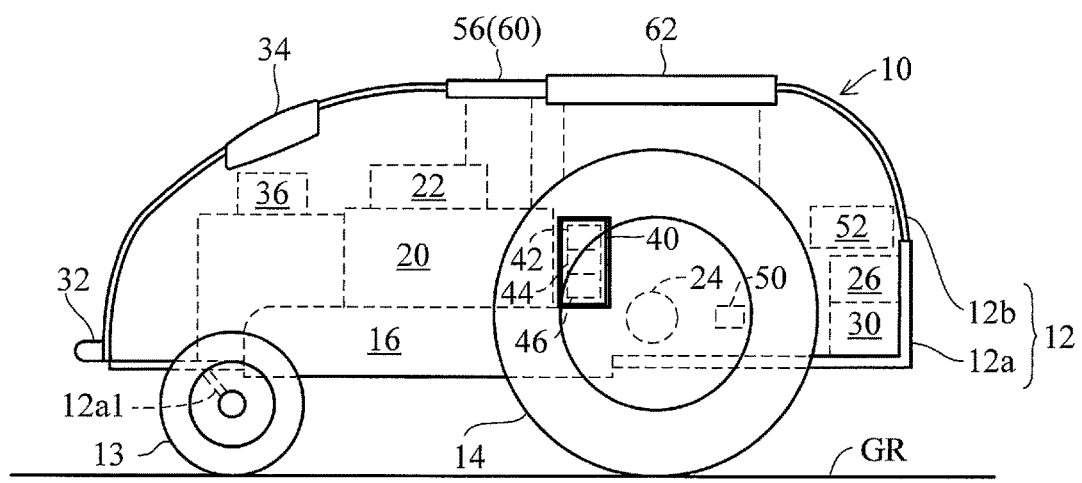
FIG. 1 is a side view of a utility vehicle according to an embodiment of this invention.
Figure 2:
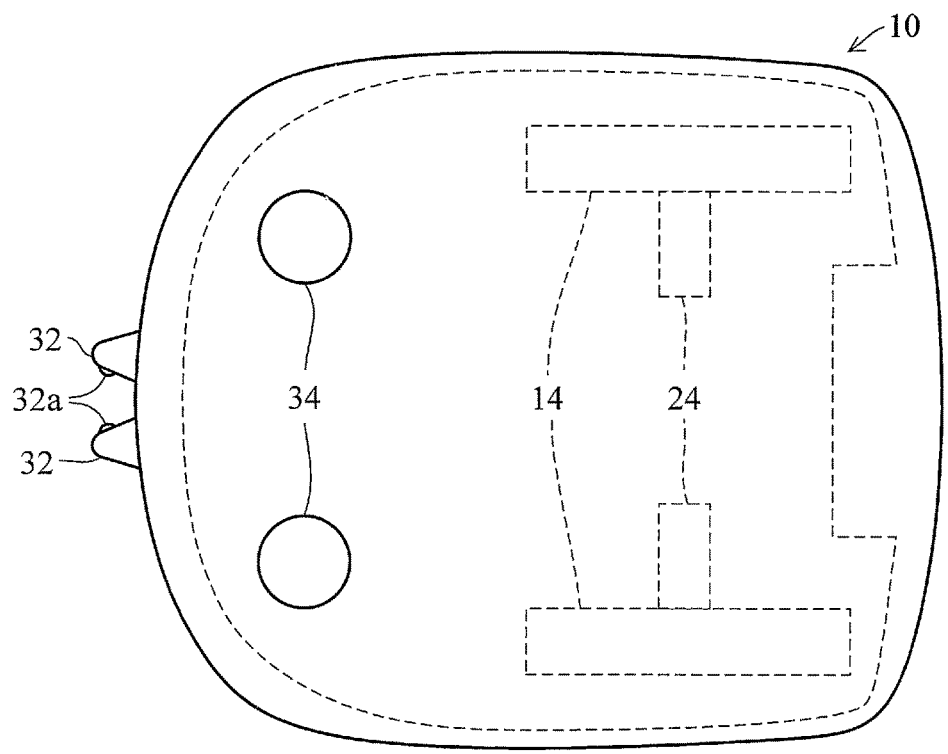
FIG. 2 is a plan view of the utility vehicle shown in FIG. 1.

FIG. 1 is an overall conceptual diagram of a utility vehicle according to the embodiment, and FIG. 2 is a plan view of the utility vehicle shown in FIG. 1.

As shown in FIGS. 1 and 2, reference symbol 10 designates a utility vehicle, more specifically an autonomously navigating utility vehicle, e.g., a mower. A body 12 of the utility vehicle 10 comprises a chassis 12a and a frame 12b attached thereto. The utility vehicle 10 is equipped with relatively small diameter left and right front wheels 13 rotatably fastened to a front end of the chassis 12a through stays 12a1 and relatively large diameter left and right rear wheels 14 rotatably fastened to the chassis 12a directly.

A work unit, e.g., a mower blade (rotary blade) 16, is attached near the middle of the chassis 12a of the utility vehicle 10, and an electric motor 20 is installed above it. The blade 16 is connected to the electric motor 20 to be driven to rotate by the electric motor (hereinafter called "work motor") 20.

A blade height regulation mechanism 22 manually operable by an operator is connected to the blade 16. The blade height regulation mechanism 22 is equipped with a screw (not shown) and configured to enable the operator to regulate the height of the blade 16 above ground level GR by manually rotating the screw.

Two electric motors (hereinafter called "travel motors") 24 are attached to the chassis 12a of the utility vehicle 10 at a rear end of the blade 16. The travel motors 24 are connected to the left and right rear wheels 14 and rotate normally (rotate to move forward) or reversely (rotate to move backward) independently on the left and right, with the front wheels 13 as non-driven wheels and the rear wheels 14 as driven wheels. The blade 16, work motor 20, travel motors 24 and so on are covered by the frame 12b.

A battery charging unit (including an AC-DC converter) 26 and a battery 30 are housed at a rear of the utility vehicle 10, and two charging terminals 32 are attached to the frame 12b so as to project forward. The charging terminals 32 have contacts 32a on their inner sides.

The charging terminals 32 are connected to the charging unit 26 through cables, and the charging unit 26 is connected to the battery 30 by cables. The work motor 20 and the travel motors 24 are configured to be powered by the battery 30 through connecting cables. The cables are not shown in FIGS. 1 and 2.

The utility vehicle 10 is thus configured as a 4-wheel, electrically-powered, autonomously navigating utility vehicle (e.g., a mower).

Left and right magnetic sensors 34 are installed on the front of the utility vehicle 10. A contact sensor 36 is attached to the frame 12b. The contact sensor 36 outputs an ON signal when the frame 12b detaches from the chassis 12a owing to contact with an obstacle or foreign object.

A housing box installed near the middle of the utility vehicle 10 houses a printed circuit board 40 carrying an ECU (Electronic Control Unit) 42, which comprises a CPU, ROM, RAM and other components, and in the vicinity thereof are installed a yaw-rate sensor (yaw sensor; angular velocity sensor) 44 that generates an output indicating angular velocity (yaw-rate) around a center-of-gravity z-axis of the utility vehicle 10, a G sensor (acceleration sensor) 46 that generates an output indicating acceleration G acting on the utility vehicle 10 in x, y and z (3-axis) directions.

Wheel speed sensors 50 installed near the rear wheels (driven wheels) 14 produce outputs indicating the wheel speeds of the rear wheels 14, and a lift sensor 52 installed between the chassis 12a and the frame 12b outputs an ON signal when the frame 12b is lifted off the chassis 12a by the operator or other worker. The utility vehicle 10 is equipped with a main switch 56 and an emergency stop switch 60 both operable by the operator.

The outputs of the magnetic sensors 34, contact sensor 36, yaw-rate sensor 44, G sensor 46, wheel speed sensors 50, lift sensor 52, main switch 56, and emergency stop switch 60 are sent to the ECU 42.

The top of the frame 12b of the utility vehicle 10 has a large cutaway in which a display 62 is fitted. The display 62 is connected to the ECU 42 and displays working modes and the like in accordance with commands from the ECU 42.

The work (mowing work) of the utility vehicle 10 configured in the aforesaid manner will be explained. The operator uses the blade height regulation mechanism 22 to manually regulate the height of the blade 16 in accordance with the growth condition of lawn in the working area and turns ON the main switch 56, causing it to output an ON signal, whereupon the ECU 42 boots up, a working mode is established, and lawn mowing work is commenced in accordance with programs stored in the ROM.

In the working mode, the ECU 42 drives the utility vehicle 10 by controlling operation of the travel motors 24 to regulate the vehicle speed detected from the wheel speed sensors 50 to a predetermined value, and puts the blade 16 to work by controlling operation of the work motor 20 to regulate the rotational speed of the blade 16 to a predetermined value.

More specifically, in the working mode the ECU 42 controls the utility vehicle 10 to service (mow) the working area by driving it randomly or in line with a predetermined program, and upon determining from the output of the magnetic sensors 34 that the utility vehicle 10 has gone outside the working area, the ECU 42 controls the utility vehicle 10 to return toward the inside of the working area by changing the direction of advance detected from the output of the yaw-rate sensor 44 by a predetermined angle.

As the configuration enables the left and right rear wheels (driven wheels) 14 to be driven forward and backward independently by the travel motors 24, the utility vehicle 10 goes straight ahead when the left and right travel motors 24 are rotated at the same speed and turns in the direction of slower rotation when they are rotated at different speeds. When one of the left and right travel motors 24 is rotated forward and the other backward, the utility vehicle 10 does turn as desired, e.g., by 180 degrees (so-called "pivot turn").

The ECU 42 stops the work motor 20 and travel motor 24 immediately when an ON signal is generated by any of the contact sensor 36, lift sensor 52 and emergency stop switch 60 during mode of operation or mode of returning to a charging station.

The configuration of right and left rear wheels (driven wheels) 14 according to the embodiment of this invention will be explained against the backdrop of the configuration of the utility vehicle 10 described above.

Figure 3A:
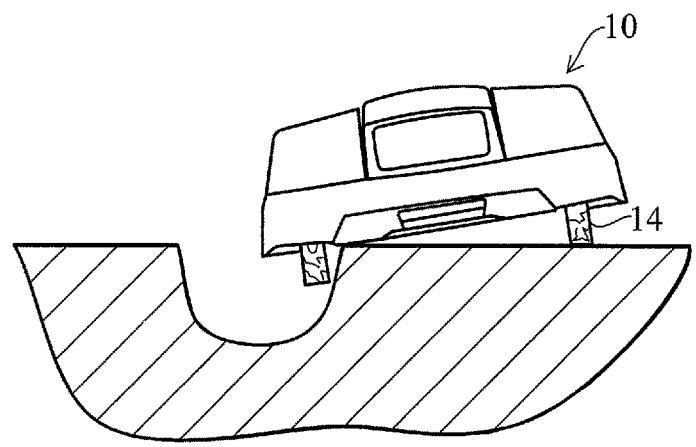
FIGS. 3A and 3B are explanatory diagrams for explaining operation of driven wheels of the utility vehicle during bad-terrain driving.

First, a general explanation will be given with reference to FIG. 3 regarding problems anticipated during traveling of the utility vehicle 10 and countermeasures for overcoming the problems. FIGS. 3A and 3B are a set of diagrams for explaining operation of the driven wheels 14 of the utility vehicle 10 during bad-terrain driving.

As indicated in FIG. 3, the working area serviced by the utility vehicle 10 is not necessarily a level place, and work must often be performed on bad terrain, namely, at spots with steep humps and hollows.

Bad terrain is especially hard to detect and avoid suitably when the utility vehicle 10 is of the autonomously navigating type. In the case of such a utility vehicle 10, therefore, it is preferable to adopt either a configuration that makes the driven wheels 14 unlikely to catch in potholes, ruts and other impediments during bad-terrain driving or a configuration that enables the driven wheels 14 to free themselves under their own power even when in a stuck and spinning situation.

Figure 3B:
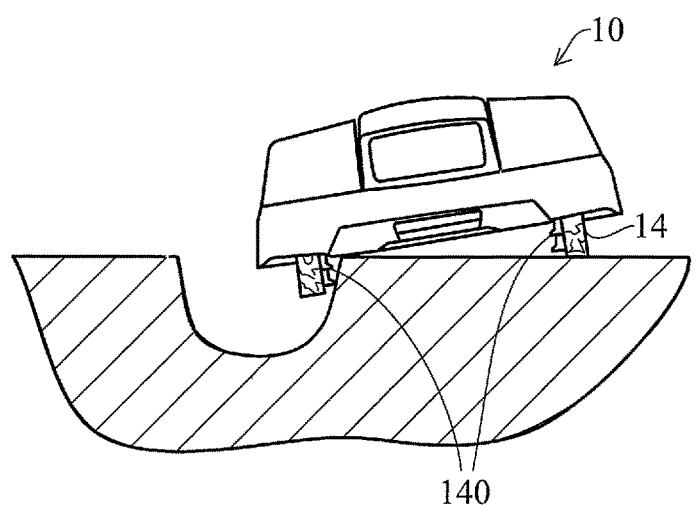

So in this embodiment of the invention, as shown in FIG. 3B, auxiliary driven wheels 140 of smaller outer diameter than the driven wheels 14 are installed on the inner sides of the left and right rear wheels (driven wheels) 14 concentrically with the driven wheels 14.

Thanks to this configuration, even if a driven wheel 14 should stick and start to spin in a pothole, rut or the like present in bad-terrain, it can free (restore) itself from the bad-terrain impediment by means of the associated auxiliary driven wheel 140.

Figure 4A:
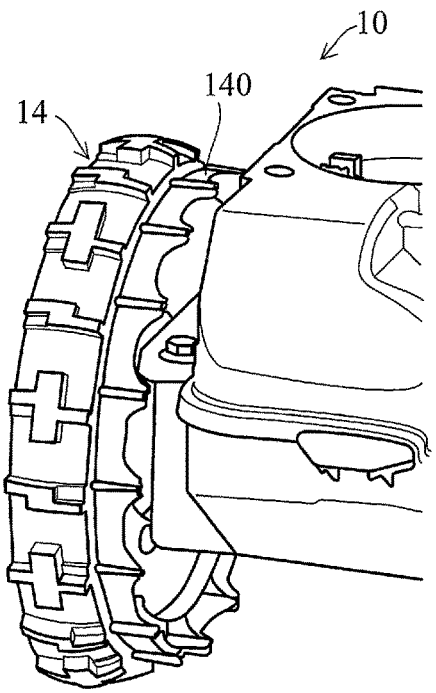
FIGS. 4A and 4B are perspective diagrams concretely showing the structure of the driven wheels of the utility vehicle.
Figure 4B:
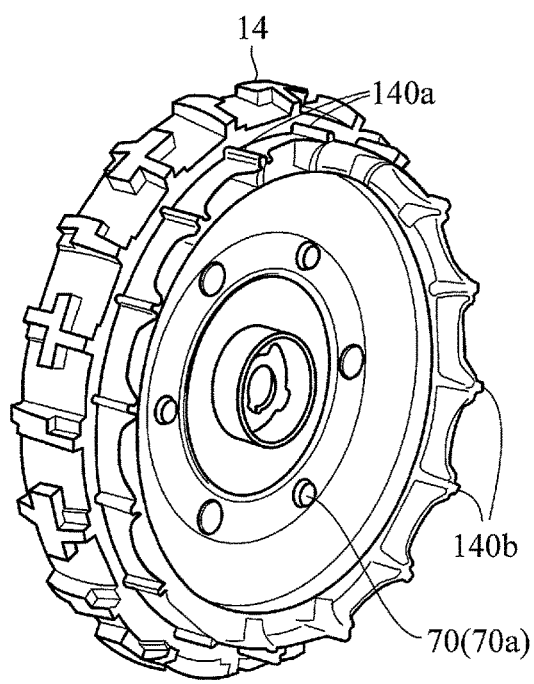

FIGS. 4A and 4B are a set of perspective diagrams concretely showing the structure of the driven wheels 14 of the utility vehicle 10.

Returning to the object of this invention, as pointed out earlier, an attempt to keep the driven wheels 14 out of impediments by enlarging their own width would lead to more noticeable tracks after job completion and be apt to spoil the appearance of the working area. Also in the case of providing auxiliary wheels that do not ordinarily touch ground, as in the prior art, wide ones would impair working performance particularly at the edge of the working area.

The goal of this embodiment of the invention is therefore to provide a driven wheel 14 for the utility vehicle 10 that enhances bad-terrain driving tenacity while also overcoming the foregoing issues.

In order to achieve this goal, an auxiliary driven wheel 140 of smaller outer diameter than the driven wheel 14 is provided on the inner side of the driven wheel 14 in this embodiment of the invention. Moreover, as shown in FIGS. 4A and 4B, the auxiliary driven wheel 140 is mounted coaxially with the driven wheel 14 and is fastened (fixed) to the inside of the driven wheel 14 by bolts 70. The auxiliary driven wheel 140 has one exposed disk face of circular cylindrical shape, and the disk face other than the exposed one (i.e., the face fixed to the inside of the driven wheel 14) is formed with holes 70a for passing the bolts 70.

It should be noted that, although the auxiliary driven wheel 140 comprises a pair of wheels each provided on the inner sides of the driven wheels 14, the auxiliary driven wheel 140 is explained here as a single wheel.

The auxiliary driven wheel 140 is formed to have a width equal to or smaller than that of the driven wheel 14. Therefore, no decline in the working performance of the utility vehicle 10 arises owing to great separation of the positions of the utility vehicle 10 proper and the driven wheel(s) 14.

In addition, as best shown in FIG. 4B, an outer peripheral surface of the auxiliary driven wheel 140 has multiple ribs 140a extending parallel to the axial direction of the driven wheel 14 and auxiliary driven wheel 140. The ribs 140a are provided across the outer peripheral surface of the auxiliary driven wheel 140 from one edge to the other in the axial direction thereof to project radially outward therefrom, and are provided successively at regular intervals over the entire outer peripheral surface of the auxiliary driven wheel 140.

The side surface of the auxiliary driven wheel 140 on the opposite side from the side surface fastened to the inside of the driven wheel 14 is formed with multiple projections or protrusions 140b projecting in the axial direction of the driven wheel 14 (and auxiliary driven wheel 140).

Specifically, as shown in FIG. 4B, projections 140b projecting from ends of the ribs 140a toward the side of the utility vehicle 10 are formed successively at regular intervals along the perimeter of the auxiliary driven wheel 140. Moreover, the projections 140b and ribs 140a are congruently positioned, with a rib 140a being formed at each position where a projection 140b is formed.

As the auxiliary driven wheel 140 in this embodiment of the invention is configured as described above, in a case where one of the driven wheels 14 encounters a bad terrain impediment, particularly if it should fall into a pothole, rut or other such depression in the working area, it can free (restore) itself by means of the auxiliary driven wheel 140, as shown in FIG. 3B.

Specifically, owing to the configuration obtained by providing the ribs 140a on the outer peripheral surface of the auxiliary driven wheels 140 and further forming the projections 140b, when the utility vehicle 10 falls into a pothole, rut or the like, thus putting one of the driven wheels 14 in a spinning condition, the ribs 140a make contact with the edge of the depression and enable the utility vehicle 10 to escape from the pothole or rut. And even in a case where the associated auxiliary driven wheel 140 also falls into the pothole or rut, the side face of the depression and the projections 140b come into contact, thereby enabling the utility vehicle 10 to escape from the pothole or the like (to restore itself from the bad-terrain impediment).

As stated above, the embodiment is configured to have a utility vehicle (10) having a body (12) and a driven wheel (14) rotatably fastened to the body, comprising: an auxiliary driven wheel (140) coaxially fixed to the driven wheel (14) and having an outer diameter smaller than that of the driven wheel (14) and a width equal to or smaller than that of the driven wheel (14). With this, bad-terrain driving tenacity can be enhanced without impairing utility vehicle working performance.

Namely, the provision of auxiliary driven wheels 140 enables improvement of bad-terrain driving tenacity in the presence of potholes, ruts and other impediments; in other words, the auxiliary driven wheels 140 can extract the utility vehicle 10 from a bad-terrain impediment such as when one of the driven wheels 14 has fallen into a pothole, rut or the like and is spinning with no traction. And as the width of the auxiliary driven wheels 140 is defined relatively small, the width of the driven wheels 14 including the auxiliary driven wheels 140 can be kept from becoming intolerably large, so that impairment of working performance at the fringe (edge) of a working area can be avoided.

In the vehicle, an outer peripheral surface of the auxiliary driven wheel (140) has multiple ribs (140a) extending in a direction parallel to an axial direction of the driven wheel (14). With this, still further improvement of the bad-terrain driving tenacity of the utility vehicle is possible.

To be more specific, when one of the driven wheels 14 falls into a pothole, rut or other such depression, the ribs 140a make contact with the edge of the depression and can produce enough traction to pull the utility vehicle 10 out of the pothole or rut, thereby further enhancing the bad-terrain driving tenacity of the utility vehicle 10.

In the vehicle, the auxiliary driven wheel (140) is in a circular cylindrical shape having an opened side face exposed to exterior and a closed side face facing the driven wheel (14) and formed with holes for passing bolts to be fastened to the driven wheel (14). With this, the auxiliary driven wheels 140 can be fastened to the driven wheels 14 firmly.

In the vehicle, the auxiliary driven wheel (140) is fixed to the driven wheel (14) at the closed side face and is formed at the opened side face with multiple projections (140b) that project in a direction parallel to an axial direction of the driven wheel (14). With this, still further improvement of the bad-terrain driving tenacity of the utility vehicle 10 is possible.

To be more specific, when not only one of the driven wheels 14 but also its auxiliary driven wheel 140 falls into a pothole, rut or other such depression, the projections formed on the auxiliary driven wheel 140 make contact with the side face of the depression and can produce enough traction to pull the utility vehicle 10 out of the pothole or rut, thereby further enhancing the bad-terrain driving tenacity of the utility vehicle 10.

In the vehicle, the projections (140b) project from ends of ribs (140a) extending in a direction parallel to an axial direction of the driven wheel. With this, in addition to the effects mentioned above, the projections 140b can be formed easily.

In the vehicle, the vehicle is an autonomously navigating utility vehicle having the body (12) and a pair of the driven wheels (14) rotatably fastened to the body (12) so as to run a work area autonomously, and the auxiliary driven wheel (140) comprises a pair of wheels each coaxially fixed to the driven wheels (14) at inner sides of the driven wheels (14). With this, even the autonomously navigating utility vehicle (10) that drives randomly within the working area does not damage the looks of the serviced working area because it does not leave noticeable tracks or other marks.

It should be noted in the above that, although the utility vehicle 10 is explained as a vehicle whose rear wheels are made the driven wheels, the invention should not be limited thereto and the utility vehicle 10 may be a vehicle whose front wheels are made driven wheels or a vehicle whose front and rear wheels are both made driven wheels.

It should further be noted that, although the utility vehicle 10 is explained as a lawn mower, the utility vehicle 10 should not be limited thereto.

While the invention has thus been shown and described with reference to specific embodiment, it should be noted that the invention is in no way limited to the details of the described arrangement; changes and modifications may be made without departing from the scope of the appended claims.

What is claimed is:

1. A utility vehicle autonomously navigating in a work area including humps and hollows, having a body and a driven wheel rotatably fastened to the body, comprising:
an auxiliary driven wheel coaxially fixed to the driven wheel and having an outer diameter smaller than that of the driven wheel and a width equal to or smaller than that of the driven wheel, wherein
the auxiliary driven wheel has an outer peripheral surface formed in a circular cylindrical shape to contact the ground, an inner surface connected to the outer peripheral surface, a closed side face fixed to a side face of the driven wheel, and an opened side face opposing to the closed side face in an axial direction of the driven wheel, the auxiliary driven wheel being formed at the opened side face with multiple projections projecting outwardly of the auxiliary driven wheel from an end of the outer peripheral surface in the axial direction,
wherein the outer peripheral surface has:
multiple ribs extending from the closed side face to the opened side face in a direction parallel to the axial direction, provided at regular intervals over an entire surface of the outer peripheral surface, and continuously bulging out from the outer peripheral surface to project radially outward from the outer peripheral surface; and
members radially spaced from the inner surface and extending from each of the ribs to adjacent ribs and extending from the closed side face to the opened side face, along the outer peripheral surface,
wherein the projections project from ends of the ribs, and
wherein each circumferential side of each rib has one of the members fastened thereon.

2. The vehicle according to claim 1, wherein the closed side face is formed with holes for passing bolts to be fastened to the driven wheel.

3. The vehicle according to claim 1, wherein the vehicle has the body and a pair of the driven wheels rotatably fastened to the body, and the auxiliary driven wheel comprises a pair of wheels each coaxially fixed to the driven wheels at inner sides of the driven wheels.

4. The vehicle according to claim 1, wherein the width of the auxiliary driven wheel including the projections is equal to or smaller than the width of the driven wheel.

5. The vehicle according to claim 1, wherein the outer peripheral surface is divided into the members by the ribs.

6. The vehicle according to claim 1, wherein the projections smoothly project from the end of the outer peripheral surface and the ends of the ribs.

7. The vehicle according to claim 1, wherein an open side of each member is arched inwardly toward a closed side of each member.

* * * * *